(12) United States Patent
Ueda et al.

(10) Patent No.: US 7,718,290 B2
(45) Date of Patent: May 18, 2010

(54) COGENERATION SYSTEM

(75) Inventors: Tetsuya Ueda, Aichi (JP); Hideo Ohara, Osaka (JP); Akinori Yukimasa, Osaka (JP)

(73) Assignee: Panasonic Corporation, Osaka (JP)

( * ) Notice: Subject to any disclaimer, the term of this patent is extended or adjusted under 35 U.S.C. 154(b) by 746 days.

(21) Appl. No.: 11/578,724

(22) PCT Filed: Feb. 17, 2006

(86) PCT No.: PCT/JP2006/302823

§ 371 (c)(1),
(2), (4) Date: Oct. 18, 2006

(87) PCT Pub. No.: WO2006/095555

PCT Pub. Date: Sep. 14, 2006

(65) Prior Publication Data

US 2009/0020281 A1      Jan. 22, 2009

(30) Foreign Application Priority Data

Feb. 18, 2005    (JP) .............................. 2005-041998

(51) Int. Cl.
H01M 8/04 (2006.01)
(52) U.S. Cl. .......................................... 429/24; 429/26
(58) Field of Classification Search .................. 429/22, 429/24, 26; 165/247, 253
See application file for complete search history.

(56) References Cited

U.S. PATENT DOCUMENTS 6,939,635 B2 *   9/2005   Ballantine et al. ............. 429/24
2005/0019631 A1 *   1/2005   Miyauchi et al. ............... 429/24
2005/0026013 A1 *   2/2005   Sakakida et al. .............. 429/24

FOREIGN PATENT DOCUMENTS

| JP | 07-280349 | 10/1995 |
| JP | 2003-056909 | 2/2003 |
| JP | 2004-263589 | 9/2004 |
| JP | 2006-052902 | 2/2006 |

* cited by examiner

*Primary Examiner*—Stephen J. Kalafut
(74) *Attorney, Agent, or Firm*—McDermott Will & Emery LLP

(57) ABSTRACT

A cogeneration system of the present invention includes: an electric power generator (5); a cooling circuit (10) configured to cool the electric power generator (5) with a first heat transfer medium; a heat exchanger (16) provided on the cooling circuit (10); an exhaust heat recovery circuit (12) through which a second heat transfer medium that exchanges heat with the first heat transfer medium via the heat exchanger (16) flows; a heat storage unit (20) connected to the exhaust heat recovery circuit (12) and configured to store the second heat transfer medium that has undergone a heat exchange by the heat exchanger (16); and a controller (21), wherein a first temperature sensor (17), and a heater to which electric power is supplied from the electric power generator (5), are connected, in this order, downstream of the heat exchanger (16) in a direction in which the second heat transfer medium flows, and the controller (21) controls a flow rate of a circulating pump (13) so that, based on a temperature detected by the first temperature sensor (17), the detected temperature becomes a predetermined target temperature. In addition to preventing water temperature decrease in heat recovery and ensuring safety, this configuration can keep water temperature high at all times.

9 Claims, 7 Drawing Sheets

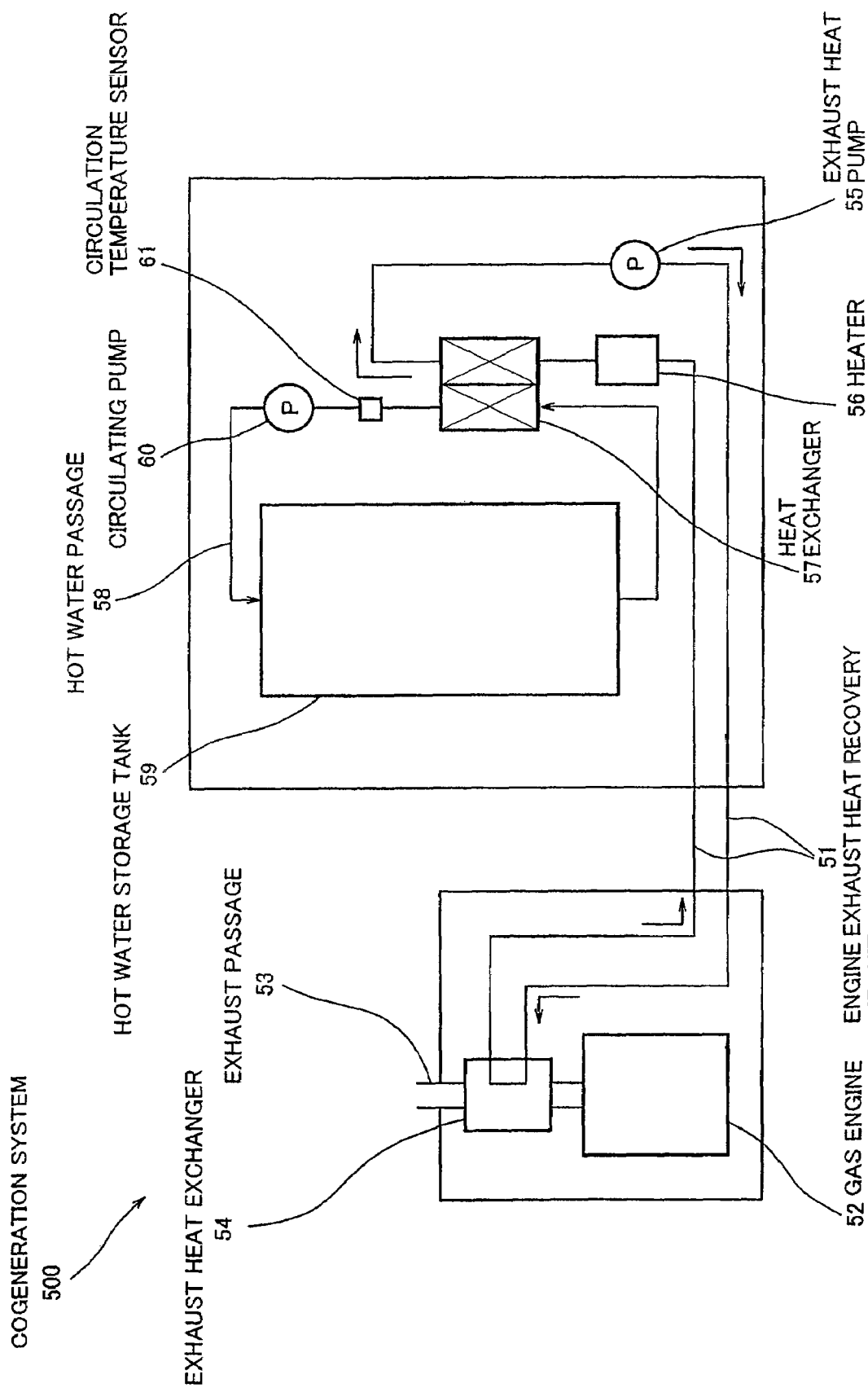
FIG. 7 *Prior Art*

COGENERATION SYSTEM

RELATED APPLICATION

This application is a national phase of PCT/JP2006/302823 filed on Feb. 17, 2006, which claims priority from Japanese Application No. 2005-041998 filed on Feb. 18, 2005, the disclosures of which Applications are incorporated by reference herein. The benefit of the filing and priority dates of the International and Japanese Applications is respectfully requested.

TECHNICAL FIELD

The present invention relates to a cogeneration system for supplying electric power generated by an electric power generator to power loads in a household, and recovering exhaust heat generated by the electric power generator by an exhaust heat recovery circuit to make use of the exhaust heat as a heat source for the household or the like.

BACKGROUND ART

A conventional cogeneration system is disclosed in, for example, Patent Reference 1. FIG. 7 is a block diagram illustrating an overview of the configuration of the conventional cogeneration system.

As illustrated in FIG. 7, this cogeneration system 500 comprises an exhaust heat exchanger 54, a heater 56, a heat exchanger 57, and an exhaust heat pump 55, which are connected in series by an engine exhaust heat recovery circuit 51. The exhaust heat exchanger 54 is connected to an exhaust passage 53 of a gas engine 52 serving as an electric power generator. A hot water storage tank 59 (heat storage unit), a heat exchanger 57, a circulation temperature sensor 61, and a circulating pump 60 are connected in series by a hot water passage 58. The heat exchanger 57 is configured so that a heat exchange can be performed between water (first heat transfer medium) in the engine exhaust heat recovery circuit 51 and water (second heat transfer medium) in the hot water passage 58.

The following describes an operation of the cogeneration system 500. An electric power generator (not shown) provided therein, which is driven by the gas engine 52, generates electric power and supplies it to a household or the like. The heat produced by the generation of electric power is transferred to the water in the engine exhaust heat recovery circuit 51 via the exhaust heat exchanger 54 connected to the exhaust passage 53. The exhaust heat pump 55 causes the water in the engine exhaust heat recovery circuit 51 to circulate, whereby the heat recovered with the exhaust heat exchanger 54 is transferred to the water in the hot water passage 58 via the heat exchanger 57. The circulating pump 60 causes the water in the hot water passage 58 to circulate, whereby the heat recovered by the heat exchanger 57 is stored in the hot water storage tank 59 in the form of hot water. This configuration makes it possible to use the electric power generated by the gas engine 52 and simultaneously to use the hot water stored in the hot water storage tank 59 for hot water supply or heating in the household or the like, thereby serving the function as a cogeneration system.

Next, the following describes the water temperature controlling method of the cogeneration system 500. The water in the hot water passage 58 is heated by the heat exchanger 57, and at this time, the circulation flow rate of the circulating pump 60 is controlled so that the water temperature detected by the circulation temperature sensor 61 becomes a target value (for example 70° C.) that is the highest temperature that can be recovered. For example, the following feedback control is performed; if the amount of heat transferred by the heat exchanger 57 from the engine exhaust heat recovery circuit 51 becomes less (specifically, the temperature detected by the circulation temperature sensor 61 becomes less than the target value), the flow rate of the circulating pump 60 is reduced so that the temperature detected by the circulation temperature sensor 61 can be kept at a high temperature. The water heated by the heat exchanger 57 is supplied into the hot water storage tank 59 from an upper part of the tank. The water supplied to the heat exchanger 57 is taken out from a lower portion of the hot water storage tank 59. By such a water temperature controlling method, the interior of the hot water storage tank 59 performs what is called "stacked heating", in which high-temperature hot water is stored in the upper part. With this system, the water temperature in the upper part can be kept high even when the entire water in the hot water storage tank 59 is not at high temperatures. High-temperature hot water can be used at any time by taking out the hot water from the upper part. To make use of this feature, it is important to keep the temperature of the portion at the circulation temperature sensor 61 high at all times in the above-described water temperature controlling method.

On the other hand, when supplying the electric power generated by the gas engine 52 to the household or the like, the system is generally connected to a power supply system (not shown) built by, for example, an electric power company, so that what is called system interconnection is implemented. By the system interconnection, electric power is supplied from outside if the power loads of, for example, the household cannot be covered by the power generation capability of the gas engine alone. When the system interconnection is implemented, what is called an inverse load flow occurs, in which electricity flows toward the power supply side if the power loads of the household or the like is small relative to the power generated by the gas engine 52. To prevent this inverse load flow, the conventional cogeneration system performs a process in which excessive electric power is converted into thermal energy by passing electricity through the heater 56.

[Patent Reference 1] Japanese Laid-Open Patent Application Publication No. 2004-263589

DISCLOSURE OF THE INVENTION

Problems to be Solved by the Invention

Nevertheless, in the just-described conventional cogeneration system, the load power in the household or the like changes sharply and frequently although the power generated by the gas engine 52 is constant or changes gradually as required. For this reason, the excessive electric power supplied to the heater 56 changes significantly, and the amount of heat supplied from the heat exchanger 57 to the hot water passage 58 accordingly changes greatly; therefore, a problem arises that the water temperature (the temperature of the second heat transfer medium) shows considerable hunting when the flow rate of the circulating pump 60 is feedback-controlled based on the circulation temperature sensor 61. If the water temperature hunts between 70° C. and 40° C. when the water temperature target value is, for example, 70° C., the water stored in the hot water storage tank 59 will be only at 55° C. on average. In other words, a problem with the conventional configuration and the conventional control method has been that they are unable to keep a sufficient storage hot water temperature (the temperature of the second heat transfer medium stored in the heat storage unit).

Means for Solving the Problems

The present invention attempts to resolve the foregoing problem, and it is an object of the present invention to provide a cogeneration system capable of keeping the second heat transfer medium in the heat storage unit at a high target temperature when recovering the exhaust heat from the electric power generator and the heat generated by excessive electric power of the electric power generator to the second heat transfer medium and storing them into the heat storage unit.

The present inventors have conducted assiduous studies to resolve the foregoing conventional problem. As a result, the inventors have found that the hunting of the water temperature occurs because there is a time lag until the fluctuation in the amount of the heat supplied from the heater takes effect on the temperature detected by the circulation temperature sensor. If such a time lag exists, a considerable amount of water with a low water temperature will have been produced in the passage including the interior of the heat exchanger at the time when the temperature of the circulation temperature sensor reduces, so the water temperature will not recover immediately even if the flow rate of the pump is lowered. Moreover, the heat capacity of water as well as the heat capacity of the heat exchanger, the pipes, and the like will also delay the response in the water temperature. For these reasons, water with a low water temperature is supplied to the hot water storage tank for a certain time period, and the storage hot water temperature (the temperature of the second heat transfer medium in the heat storage unit) cannot be kept sufficiently high. Based on these findings, the inventors have come up with an idea that providing a heater at the downstream side from the temperature sensor can lessen the adverse effect of the fluctuation in the amount of the heat supplied from the heater on the flow rate of the pump, and makes it possible to keep the water temperature in the hot water storage tank at a high target temperature.

In order to resolve the foregoing conventional problems, the present invention provides a cogeneration system comprising an electric power generator; a cooling circuit configured to cool the electric power generator with a first heat transfer medium; a heat exchanger provided on the cooling circuit; an exhaust heat recovery circuit through which a second heat transfer medium that exchanges heat with the first heat transfer medium via the heat exchanger flows; a heat storage unit connected to the exhaust heat recovery circuit and configured to store the second heat transfer medium that has undergone the heat exchange by the heat exchanger; and a controller, wherein: a first temperature sensor and a heater to which electric power is supplied from the electric power generator are connected, in this order, downstream of the heat exchanger in a direction in which the second heat transfer medium flows; a circulating pump configured to circulate the second heat transfer medium is further connected to the exhaust heat recovery circuit; and the controller controls a flow rate of the circulating pump so that, based on a temperature detected by the first temperature sensor, the detected temperature becomes a predetermined target temperature.

In this configuration, the heater is arranged downstream of the first temperature sensor; therefore, whether or not the heater performs heating does not directly affect the temperature detected by the first temperature sensor. In addition, the temperature of the first heat transfer medium is controlled based on the temperature detected by the first temperature sensor. Consequently, in recovering the exhaust heat from the electric power generator and the heat produced by excessive electric power of the electric power generator to the second heat transfer medium and storing them in the heat storage unit, the temperature of the first heat transfer medium does not hunt even when the excessive electric power fluctuates, making it possible to keep the second heat transfer medium in the heat storage unit at a high target temperature.

In the above-described cogeneration system, the controller may stop an operation if the temperature detected by the first temperature sensor has become a first determination temperature or higher.

This configuration makes it possible to ensure safety such that the user will be prevented from a burn from hot water in the hot water storage tank that is brought to an abnormally high temperature due to boiling or the like.

The above-described cogeneration system may further comprise a second temperature sensor provided downstream of the heater in the direction in which the second heat transfer medium flows, and the controller may increase the flow rate of the circulating pump if the temperature detected by the second temperature sensor rises to a first threshold value or higher.

This configuration makes it possible to prevent the second heat transfer medium from being overheated by the heater.

In the above-described cogeneration system, the controller may increase the flow rate of the circulating pump further if the temperature detected by the second temperature sensor becomes a second threshold value or higher, the second threshold value being higher than the first threshold value.

This configuration makes it possible to prevent the second heat transfer medium from being overheated by the heater.

In the above-described cogeneration system, the controller may stop an operation if the temperature detected by the second temperature sensor becomes a second threshold value or higher, the second threshold value being higher than the first threshold value.

This configuration makes it possible to ensure safety such that the user will be prevented from a burn from hot water in the hot water storage tank that is brought to an abnormally high temperature due to boiling or the like.

In the above-described cogeneration system, the controller may increase the flow rate of the circulating pump further if the temperature detected by the second temperature sensor becomes a second threshold value or higher, the second threshold value being higher than the first threshold value.

This configuration can prevent the second heat transfer medium from being overheated by the heater efficiently.

Further, the above-described cogeneration system may stop an operation if the temperature detected by the second temperature sensor becomes a third threshold value or higher, the third threshold value being higher than the second threshold value.

This configuration makes it possible to efficiently prevent the second heat transfer medium from being overheated by the heater, and at the same time to ensure safety such that the user will be prevented from a burn from hot water in the hot water storage tank that is brought to an abnormally high temperature due to boiling or the like.

In the above-described cogeneration system, the heater may be supplied with excessive electric power of the electric power generated by the electric power generator that is not supplied to an external load.

This configuration enhances the energy efficiency of the system since the electric power generated by the electric power generator can be utilized effectively as a heat source.

In the above-described cogeneration system, the electric power generator may be a fuel cell.

A solid polymer electrolyte fuel cell is suitable for the electric power generator of the cogeneration system because it is capable of generating heat and electric power simultaneously and is also highly versatile.

In the above-described cogeneration system, the electric power generator may be a solid polymer electrolyte fuel cell, the heat storage unit may be a hot water storage tank, and water in the hot water storage tank may be heated to a temperature higher than the predetermined target temperature by supplying electricity from a power supply system to the heater according to control by the controller.

This configuration allows the water in the hot water storage tank to be heated to a high temperature even when there is no excessive electric power, and therefore can prevent propagation of germs in the hot water storage tank.

Effects of the Invention

The cogeneration system according to the present invention has the above-described configurations and exhibits advantageous effects as follows. Specifically, the foregoing hunting problem is eliminated when recovering the exhaust heat from the electric power generator and the heat generated by the excessive electric power of the electric power generator to the second heat transfer medium and storing them into the heat storage unit. Therefore, a cogeneration system can be provided that is capable of keeping the second heat transfer medium in the heat storage unit at a high target temperature.

BRIEF DESCRIPTION OF THE DRAWINGS

FIG. 7 is a block diagram illustrating an overview of the configuration of a conventional cogeneration system.

Figure 1:
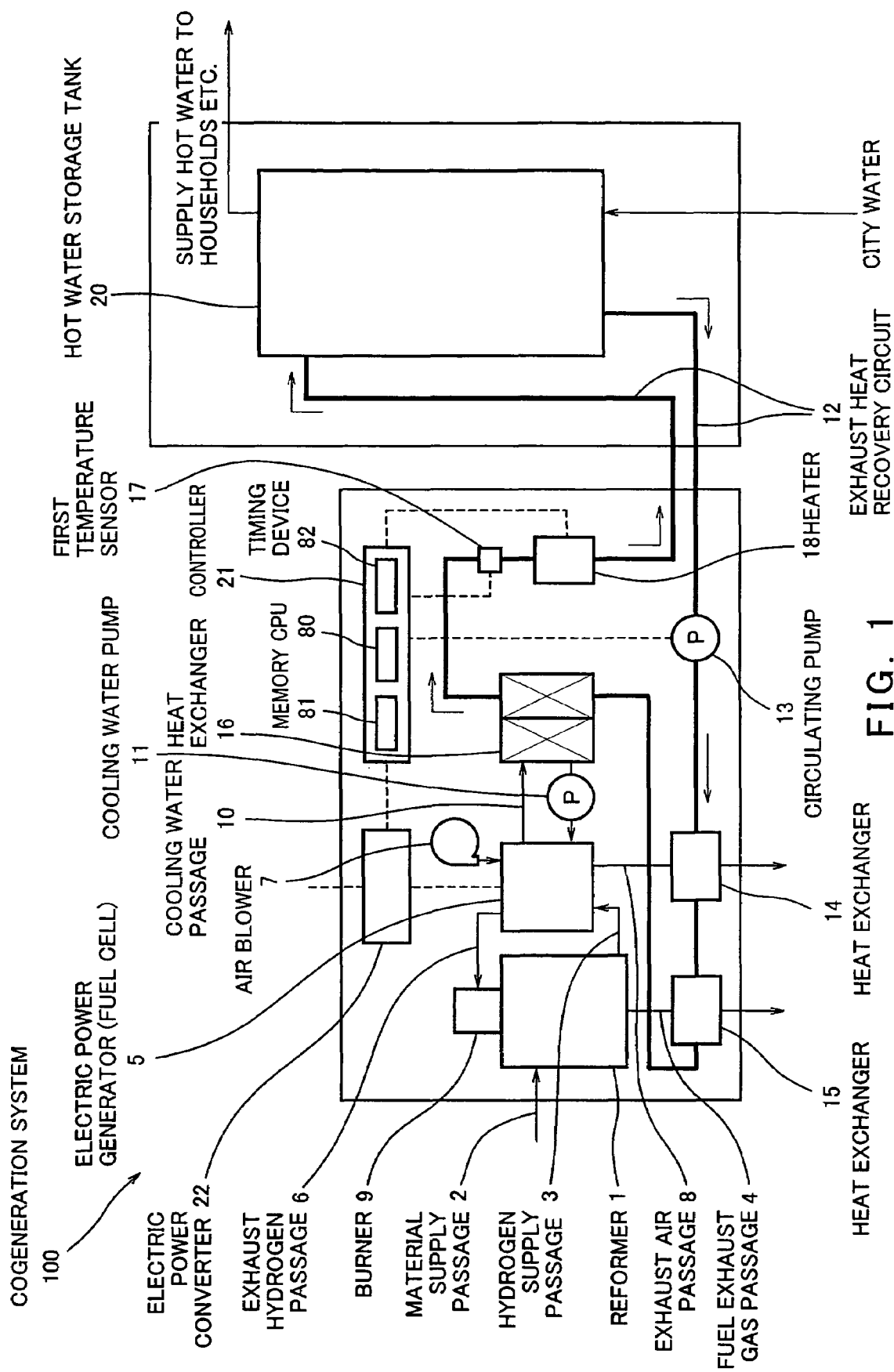
FIG. 1 is a block diagram illustrating an overview of the configuration of a cogeneration system according to a first embodiment of the present invention.

BRIEF DESCRIPTION OF THE REFERENCE NUMERALS 1 reformer
2 material supply passage
3 hydrogen supply passage
4 fuel exhaust gas passage
5 electric power generator (fuel cell)
6 exhaust hydrogen passage
7 air blower
8 exhaust air passage
9 burner
10 cooling water passage
11 cooling water pump
12 exhaust heat recovery circuit
13 circulating pump
14 heat exchanger
15 heat exchanger
16 heat exchanger
17 first temperature sensor
18 heater
19 second temperature sensor
20 hot water storage tank
21 controller
22 electric power converter
31 power load
32 power supply system
33 inverse load flow sensor
51 engine exhaust heat recovery circuit
52 gas engine
53 exhaust passage
54 exhaust heat exchanger
55 exhaust heat pump
56 heater
57 heat exchanger
58 hot water passage
59 hot water storage tank
60 circulating pump
61 circulation temperature sensor
80 CPU
81 memory
82 timing device
100 cogeneration system
200 cogeneration system
300 cogeneration system
400 cogeneration system
500 cogeneration system

BEST MODE FOR CARRYING OUT THE INVENTION

Hereinbelow, preferred embodiments of the present invention are described with reference to the drawings.

First Embodiment

FIG. 1 is a block diagram illustrating an overview of the configuration of a cogeneration system according to a first embodiment of the present invention. Hereinbelow, the hardware and the control system of a cogeneration system 100 will be described with reference to FIG. 1.

First, the hardware of the cogeneration system 100 will be described. The cogeneration system 100 has a reformer 1, a material supply passage 2, a hydrogen supply passage 3, a combustion exhaust gas passage 4, and an electric power generator 5 (fuel cell). The hydrogen supply passage 3 and the exhaust hydrogen passage 6 are connected to a hydrogen electrode (not shown) of the electric power generator 5, and an air blower 7 and an exhaust air passage 8 are connected to an oxygen electrode (not shown) thereof. The electric power generated by the electric power generator 5 is taken out by an electric power converter 22 and supplied to an external load. The reformer 1 is provided with a burner 9 connected to the exhaust hydrogen passage 6, for combusting hydrogen exhaust gas. The cogeneration system 100 further has a cooling water passage 10, an exhaust heat recovery circuit 12, and a hot water storage tank 20. The cooling water passage 10 is a cooling circuit that passes cooling water, which serves as a first heat transfer medium for cooling the electric power generator 5, therethrough. The cooling water passage 10 is provided with a cooling water pump 11. The exhaust heat recovery circuit 12 is a cooling circuit that passes water, which serves as a second heat transfer medium for cooling the first heat transfer medium, therethrough. Connected to the exhaust heat recovery circuit 12 are a circulating pump 13, a heat exchanger 14 fitted to the exhaust air passage 8, a heat exchanger 15 fitted to the combustion exhaust gas passage 4, a heat exchanger 16 fitted to the cooling water passage 10, a first temperature sensor 17, a heater 18, and a hot water storage tank 20 (heat storage unit, or heat storage means), in this order, along the circulation direction of the water. City water is supplied to the hot water storage tank 20 as required. In the present embodiment, a solid polymer electrolyte fuel cell is used for the electric power generator 5.

Next, the control system of the cogeneration system 100 will be described. The control system of the cogeneration system 100 has a controller 21 (controlling means), the circulating pump 13, the first temperature sensor 17, the heater 18, and the electric power converter 22. The positional relationship between the first temperature sensor 17 and the heater 18 is as follows. That is, the first temperature sensor 17 and the heater 18 are connected to the exhaust heat recovery circuit 12 in this order downstream of the heat exchanger 16 in the direction in which the second heat transfer medium flows.

The controller 21 is constituted by, for example, a microcomputer circuit board provided with a CPU 80, a memory 81, a timing device 82, and I/O (not shown). The controller 21 controls the output of the electric power generator 5 according to the load amount of an external load, which is not shown in the figure. Specifically, the controller 21 controls the amount of generated electric power by controlling the amount of the air supplied from the air blower 7 and the amount of the hydrogen supplied from the reformer 1 (the amount of material supplied from the material supply passage 2 and the amount of heating by the burner 9) based on the load amount of the external load according to a program stored within the controller 21. The controller 21 receives detection signals from the first temperature sensor 17 and an inverse load flow sensor 33 (described later), and controls the operation of the circulating pump 13 and the supply of electricity (described later) to the heater 18 from the electric power converter 22 according to the program stored in the controller 21. The controller 21 controls the temperature of the water in the cooling water passage by controlling the cooling water pump 11 based on the detection result of a temperature sensor that is not shown in the drawing (which may be installed, for example, inside the electric power generator 5 or inside the cooling water passage 10). It should be noted that a plurality of the controllers 21 may be provided. In other words, the control by the controller 21 may be either distributed control or centralized control.

Figure 2:
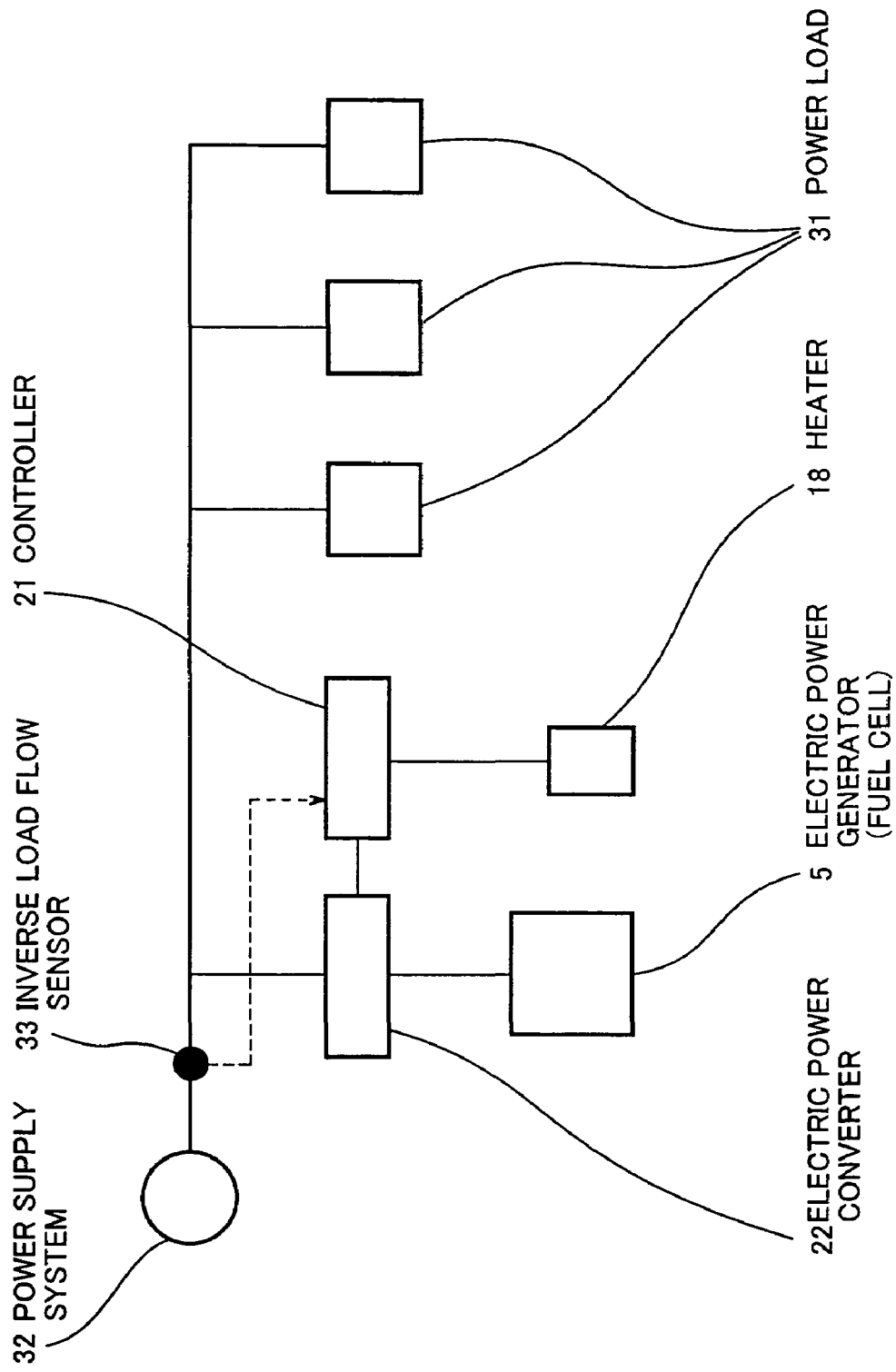
FIG. 2 is a block diagram schematically illustrating an electrical power system of the cogeneration system according to the first embodiment of the present invention.

FIG. 2 is a block diagram schematically illustrating an electrical power system of the cogeneration system according to the first embodiment of the present invention. The electric power converter 22 for converting direct-current power generated by the electric power generator 5, serving as an electric power generator, into alternating current is connected to a power supply system 32 built by an electric power company or the like and to power loads 31 (external load) of households or the like. The heater 18, serving as an internal load, is connected to the electric power converter 22 via the controller 21. The controller 21 has a switch for switching on/off the supply of electricity to the heater 18 and controls the on/off switching. An inverse load flow sensor 33 is provided at an electricity receiving point of the power supply system 32. A current sensor, for example, is used for the inverse load flow sensor 33. The detection output of the inverse load flow sensor 33 is input to the controller 21 so that the result of the detection can be sent to the controller 21. In such a system interconnection, the electric power generator 5 performs electric power generation corresponding to the power consumption of the power loads 31; however, when the power consumption of the power loads 31 abruptly changes, the amount of hydrogen supplied to the electric power generator 5 by the reformer 1 (see FIG. 1) cannot respond to the change instantaneously, so the electric power generated by the electric power generator 5 cannot keep up with the change instantaneously. If the external load is greater than the electric power generated by the electric power generator 5, electric power that covers the shortfall is supplied from the power supply system 32, but if the external load is less than the electric power generated, the electricity inversely flows toward the power supply system 32 side. The alternating current waveform that flows in the electrical power system has restrictions, so if an inverse load flow occurs, an electric current that is outside the restrictions may be passed to the system depending on the conditions of use of alternating current output auxiliary equipment and consequently the alternating current waveform in the system may be disrupted. The cogeneration system 100 supplies its excessive electric power (an excessive portion of the electric power that is output from the electric power generator 5, which is not supplied to the external load) to the heater 18 if the inverse load flow sensor 33 detects an inverse load flow, so that it is converted into thermal energy. These controls are executed by the controller 21. Such controls enable effectively utilization of the energy of the excessive electric power in the form of the thermal energy of hot water, enhancing the energy efficiency of the cogeneration system 100.

Next, the operations of the cogeneration system 100 will be described in the following, in which electric power generation and heat utilization are discussed separately. First, an operation for carrying out electric power generation by the cogeneration system 100 will be explained. Materials such as hydrocarbon and water are supplied through the material supply passage 2 to the reformer 1, then heated by the burner 9 within the reformer 1, and converted into hydrogen through a reforming reaction on a reforming catalyst. This hydrogen is supplied through the hydrogen supply passage 3 to the hydrogen electrode of the electric power generator 5 and is consumed within the electric power generator 5. Thereafter, excessive hydrogen is supplied to the burner 9 via the exhaust hydrogen passage 6 and is used as a fuel for heating the reformer 1. Air is supplied to the oxygen electrode of the electric power generator 5 from the air blower 7 and is discharged from the exhaust air passage 8 to outside after oxygen is consumed in the electric power generator 5. In the electric power generator 5, the hydrogen reacts with the oxygen in the air, whereby electric power is generated. The generated direct-current power is converted into alternating current by the electric power converter 22 and is supplied to the external loads installed in a household or the like.

Next, the following describes an operation for recovering the exhaust heat generated during power generation by the electric power generator 5 in the cogeneration system 100. The electric power generator 5 produces heat during its power generation operation. The heat produced by the electric power generator 5 is taken out of the electric power generator 5 by the water (the first heat transfer medium) circulated in the cooling water passage 10 by the cooling water pump 11, and is transferred to the water (the second heat transfer medium) within the exhaust heat recovery circuit 12 via the heat exchanger 16. The transferred heat turns the water in the exhaust heat recovery circuit 12 into hot water. The hot water is fed with a pressure by the circulating pump 13, and is stored in the hot water storage tank 20. The hot water stored in the hot water storage tank 20 is used as hot water supply or for house heating in the household or the like. Through such operations, the cogeneration system 100 serves the functions as an electric power generator and a hot-water supplying and heat supplying apparatus.

The cogeneration system 100 is equipped with a plurality of heat exchangers on the exhaust heat recovery circuit 12 in order to enhance the recovery efficiency of the exhaust heat. More specifically, the heat exchanger 15 for recovering the heat discharged from combustion exhaust gas passage 4 is connected upstream of the heat exchanger 16 fitted to the cooling water passage 10, and the heat exchanger 14 for recovering the heat discharged from the exhaust air passage 8 is connected further upstream therefrom. Such a configuration makes it possible to recover the heat discharged from the electric power generator 5 more efficiently.

Next, the following describes an operation for controlling the temperature of the hot water supplied to the hot water storage tank 20 in the cogeneration system 100, which is a characteristic feature of the present invention. The water within the exhaust heat recovery circuit 12 is taken out from an outlet port arranged at a lower portion of the hot water storage tank 20, and is heated by the heat exchanger 14, the heat exchanger 15, and the heat exchanger 16. The controller 21 controls a flow rate Q of the circulating pump 13 so that a water temperature (first detection temperature) detected by the first temperature sensor 17 will always be substantially equal to the highest temperature that can be recovered, in other words, substantially equal to the water temperature in the cooling water passage 10 (70° C. in the first embodiment). If the amount of heat transferred to the exhaust heat recovery circuit 12 (the amount of heat supplied from the electric power generator 5) becomes small during the operation, the flow rate of the circulating pump 13 is reduced to keep the water temperature of the location of the first temperature sensor 17 at a high temperature. The cogeneration system 100 performs what is called "stacked heating." More specifically, the water taken out from a lower part of the hot water storage tank 20 goes through the heat exchangers 14, 15, and 16 and becomes high-temperature hot water, which is then supplied from a supply port disposed at an upper part of the hot water storage tank 20. With the stacked heating, high-temperature water is stored in the upper layer part. Accordingly, the stacked heating has a feature that, even if the whole amount of the water in the hot water storage tank 20 has not been turned to high temperature, high-temperature hot water can be used when hot water is required, by taking out hot water inside the hot water storage tank 20 from the upper layer part thereof. To make use of the feature of the stacked heating, the water temperature at the location of the first temperature sensor 17 (the temperature of the hot water supplied to the hot water storage tank 20) needs to be always kept at a high temperature stably. A characteristic feature of the cogeneration system 100 is that while it is provided with the mechanism for elevating water temperature by supplying excessive electric power to the heater 18, hot water supplied to the hot water storage tank 20 can be kept constantly at a certain temperature or higher. In the following, a water temperature control operation of the cogeneration system 100 will be described.

Figure 3:
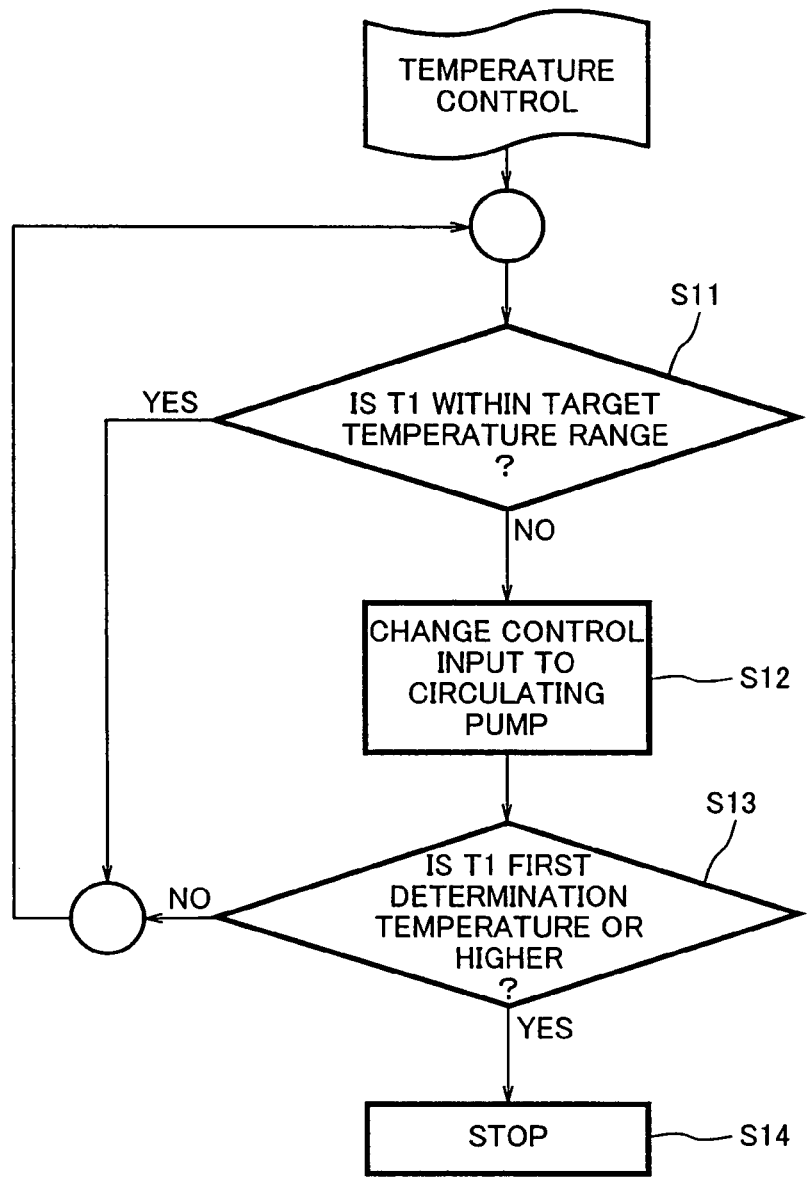
FIG. 3 is a flowchart schematically illustrating one example of the program for controlling water temperature by a controller in the first embodiment of the present invention.

FIG. 3 is a flowchart schematically illustrating one example of the water temperature control program executed by a controller, in accordance with the first embodiment of the present invention. In FIG. 3, T1 denotes the water temperature detected by the first temperature sensor. The target temperature range is set to be, for example, not lower than 65° C. and not higher than 70° C. A first determination temperature is, for example, set at 75° C. Hereinbelow, an operation of the controller 21 in the first embodiment will be described with reference to the flowchart of FIG. 3.

After starting the water temperature control, the controller 21 determines at step S11 whether or not T1 is within the target temperature range. If T1 is within the target temperature range, the determination of step S11 is repeated. If T1 is determined to be outside the target temperature range at step S11, the controller 21 changes a control input (flow rate) of the circulating pump 13 (S12). At this time, if T1 is lower than the lower limit of the target temperature range, the controller 21 changes the control input to the circulating pump 13 so that the flow rate will become less, whereas if T1 is higher than the upper limit of the target temperature range, the controller 21 changes the control input to the circulating pump 13 so that the flow rate will become greater. After changing the control input, it is determined whether or not T1 is the first determination temperature or higher (S13). If it is determined that T1 is the first determination temperature or higher, the controller 21 stops the operation of the cogeneration system 100 (S14). If T1 is less than the first determination temperature, the process returns to step S11. It should be noted that the above-described control relates to only the control to the circulating pump 13 based on T1, but other controls (the operations of the fuel cell and so forth) are of course carried out as appropriate by interruption processing, parallel processing, and the like. In addition, when the operation of the cogeneration system 100 is stopped, the control to the circulating pump 13 based on T1 is also stopped.

Such control enables T1 to be kept within a target temperature range. Because the heater 18 is arranged downstream of the first temperature sensor 17 (between the first temperature sensor 17 and the hot water storage tank 20), T1 is not directly affected by whether or not the heater 18 performs heating. When T1 is kept within a target temperature range, the temperature of the hot water supplied into the hot water storage tank 20 can be kept at a predetermined temperature or higher. Thus, water temperature in the hot water storage tank 20 can be kept at a high target temperature. When feedback control to the circulating pump 13 is performed with the water temperature after heated by the heater 18 as in the conventional systems, hunting of water temperature occurs due to a fluctuation of the heating amount of the heater 18 associated with an abrupt load power change, which is difficult to predict. In the present embodiment, feedback control to the circulating pump 13 is performed based on the water temperature prior to the heating by the heater 18, and therefore, no hunting problem arises. It should be noted that the control shown in FIG. 3 is merely an illustrative example, and any control may be carried out as long as the control allows the temperature detected by the first temperature sensor to be a predetermined target temperature.

In the cogeneration system of the present embodiment, the first temperature sensor 17 and the heater 18, to which excessive electric power of the electric power generator 5 is supplied, are connected, in this order, downstream of the heat exchanger 16 for exchanging heat between the first heat transfer medium and the second heat transfer medium, and the controller 21 controls the flow rate of the circulating pump 13 based on the temperature T1 detected by the first temperature sensor 17 so that T1 falls within a predetermined target temperature range. Such a configuration can resolve the above-described problem of hunting when recovering the exhaust heat from the electric power generator and the heat produced from excessive electric power of the electric power generator to the second heat transfer medium and storing them into the heat storage unit, and therefore, it becomes possible to keep the second heat transfer medium in the heat storage unit at a high target temperature.

Moreover, in the cogeneration system of the present embodiment, excessive electric power that is not supplied to the power loads 31 is supplied to the heater 18. Such a configuration makes it possible to effectively utilize the electric power generated by the electric power generator 5 as a heat source, thereby enhancing the energy efficiency of the system.

Furthermore, in the cogeneration system of the present embodiment, the electric power generator 5 is a solid polymer electrolyte fuel cell. The solid polymer electrolyte fuel cell is capable of generating heat and electric power at the same time and is highly versatile; therefore, it is suitable for the electric power generator of the cogeneration system. It should be noted that the electric power generator 5 is not limited to a fuel cell, but may be an electric power generator using an engine or the like.

In the foregoing description, the heater 18 is arranged between the first temperature sensor 17 and the hot water storage tank 20, but it may be arranged between the outlet port of the hot water storage tank 20 and the heat exchanger 16. It is sufficient that the heat exchanger 16, the first temperature sensor 17, and the heater 18 be arranged on the exhaust heat recovery circuit 12 in this order.

Second Embodiment

Figure 4:
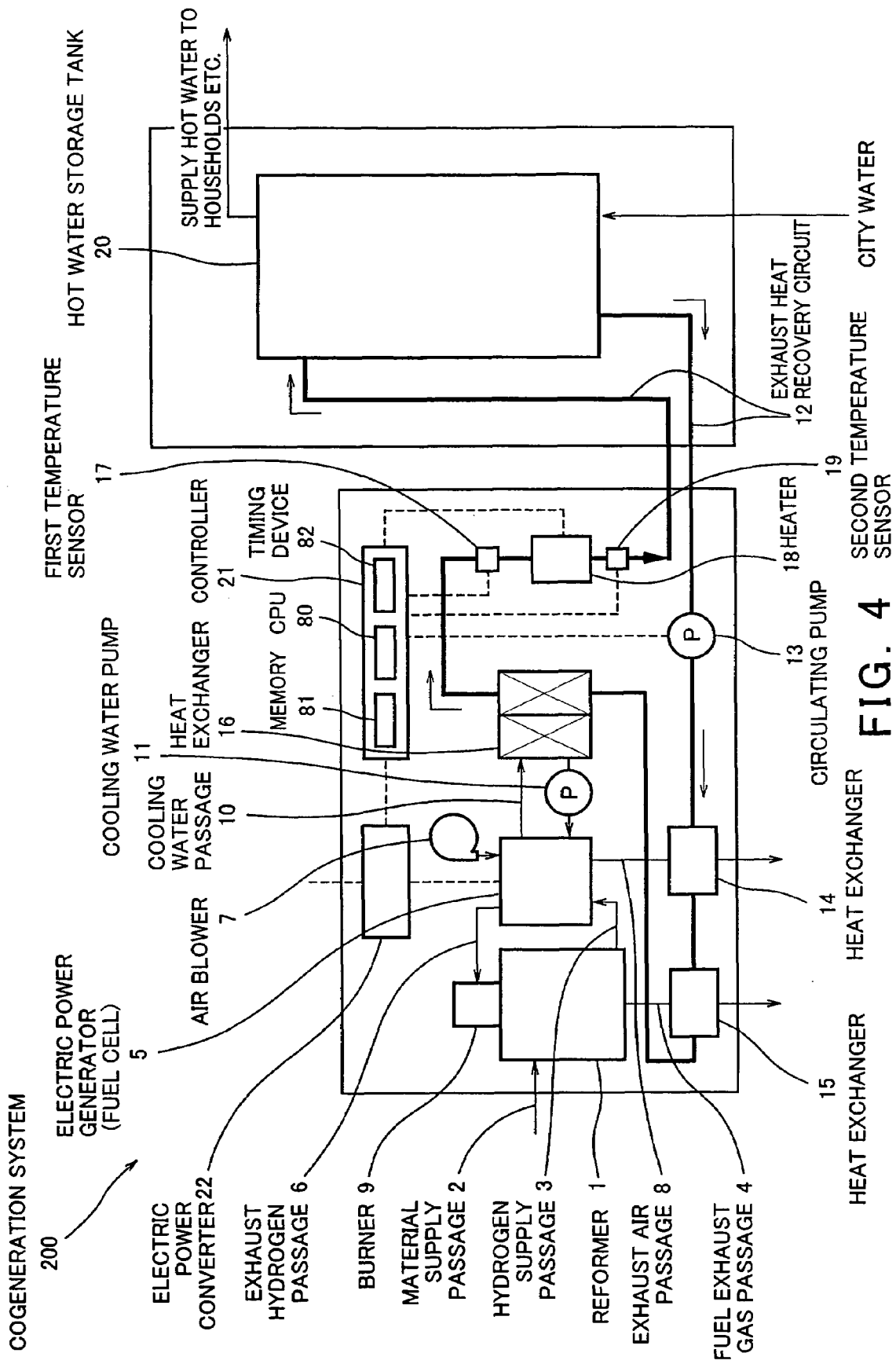
FIG. 4 is a block diagram illustrating an overview of the configuration of a cogeneration system according to a second embodiment of the present invention.

FIG. 4 is a block diagram illustrating an overview of the configuration of a cogeneration system according to a second embodiment of the present invention. In a cogeneration system 200 of the second embodiment, a second temperature sensor 19 is additionally provided downstream of the heater 18 in the exhaust heat recovery circuit 12 of the cogeneration system 100 according to the first embodiment, and the other portions are similar to the configuration of the cogeneration system 100. Accordingly, the elements that are common in both the first embodiment and in the second embodiment are designated by the same reference numerals and names, and no further elaborations will be made here.

The second temperature sensor 19 is a device for detecting the temperature of water that passes through the interior of the exhaust heat recovery circuit 12. The second temperature sensor 19 is located downstream of the heater 18. In other words, the first temperature sensor 17, the heater 18, and the second temperature sensor 19 are arranged in this order downstream of the heat exchanger 16 in the direction in which the second heat transfer medium flows. The second temperature sensor 19 detects the water temperature after being heated by the heat exchanger 16 and the heater 18, and sends the result to the controller 21.

Next, the operation that constitutes a characteristic feature of the cogeneration system 200 will be described. As described in the first embodiment, the circulation flow rate of the circulating pump 13 is controlled by the controller 21 so that the water temperature (T1) detected by the first temperature sensor 17 falls within a target temperature range. Here, when excessive electric power is supplied to the heater 18, there may be a case in which the hot water may be further heated at the heater 18 and may be brought to a higher temperature than the upper limit of the target temperature range. At this time, the heating amount by the heater 18 may become large depending on the magnitude of the excessive electric power, which can bring the water that is at the outlet from the heater 18 to boiling. In the second embodiment, in order to avoid the boiling, the controller 21 controls the flow rate of the circulating pump 13 based on a water temperature (T2) detected by the second temperature sensor 19 so that overheating by the heater 18 can be prevented. Specifically, if T2 rises to a first threshold value or higher, the controller 21 increases the flow rate of the water in the exhaust heat recovery circuit 12 by a first predetermined amount, by increasing the output of the circulating pump 13. If T2 rises to a second threshold value or higher (the second threshold value>the first threshold value), the controller 21 stops the operation of the system for safety reasons.

Figure 5:
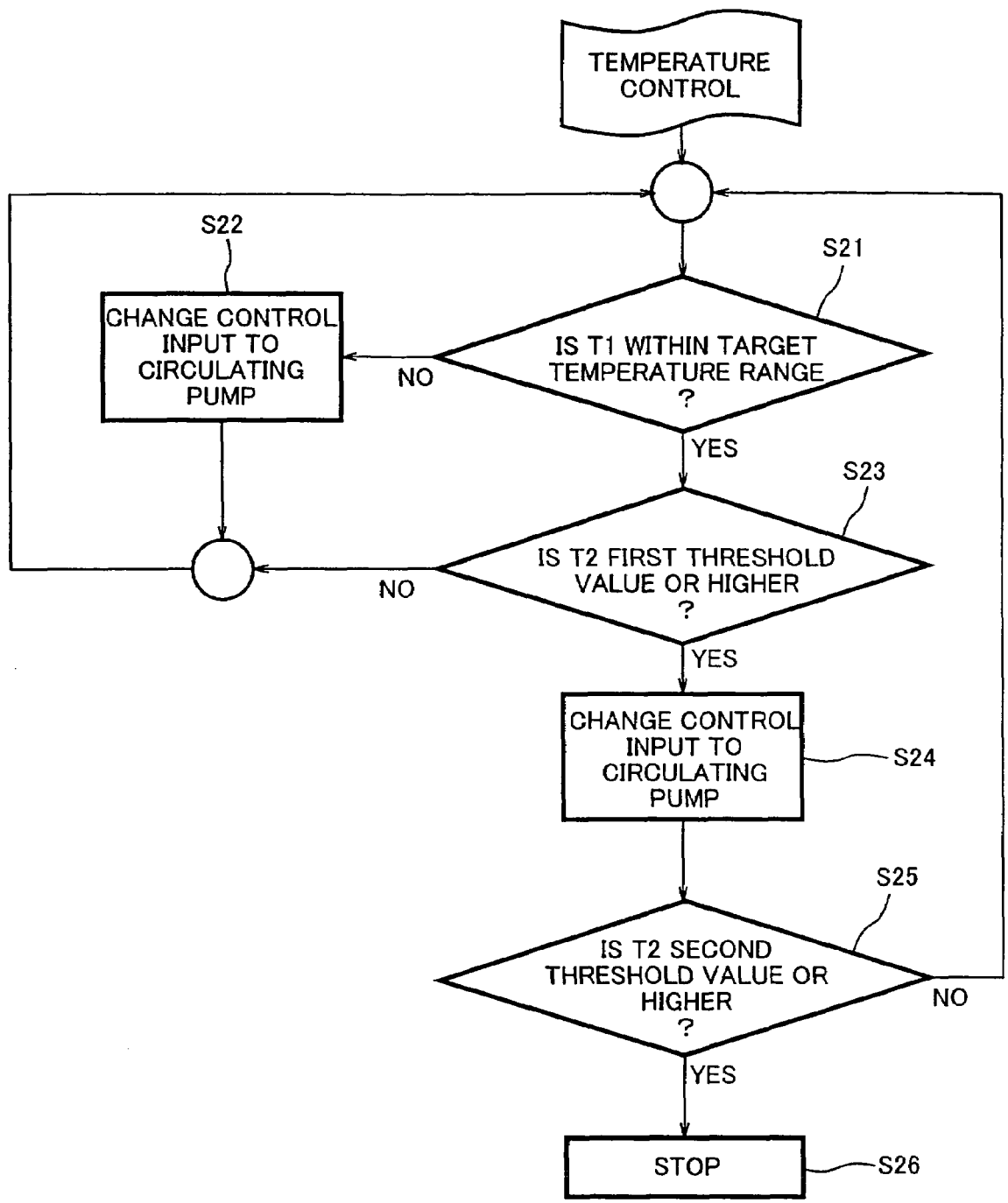
FIG. 5 is a flowchart schematically illustrating one example of the program for controlling water temperature by a controller in the second embodiment of the present invention.

FIG. 5 is a flowchart schematically illustrating one example of the water temperature control program executed by the controller, in accordance with the second embodiment of the present invention. In FIG. 5, T1 denotes a water temperature detected by the first temperature sensor 17, and T2 denotes a water temperature detected by the second temperature sensor 19. The target temperature range is set to be not lower than 65° C. and not higher than 70° C. The first determination temperature is set at, for example, 75° C. Hereinbelow, an operation of the controller 21 in the second embodiment will be described with reference to the flowchart of FIG. 5.

After starting the water temperature control, the controller 21 determines at step S21 whether or not T1 is within the target temperature range. If T1 is outside the target temperature range, the controller 21 changes a control input (flow rate) of the circulating pump 13 (S22). At this time, if T1 is lower than the lower limit of the target temperature range, the controller 21 changes the control input to the circulating pump 13 so that the flow rate will become less. On the other hand, if T1 is higher than the upper limit of the target temperature range, the controller 21 changes the control input to the circulating pump 13 so that the flow rate will become greater. After changing the control input, the process returns to step S21. If T1 is determined to be within the target temperature range at step S21, it is determined whether or not T2 is the first threshold value or higher (S23). If T2 is determined to be not the first threshold value or higher, the process returns to step S21. If T2 is determined to be the first threshold value or higher, the control input to the circulating pump 13 is changed so that the circulation flow rate will increase (S24). With the increase in the flow rate, the amount of the heat transferred by the heat exchangers 14, 15, and 16 to the second heat transfer medium reduces, thereby preventing overheating. After step S24, it is determined whether or not T2 is the second threshold value or higher (S25). If T2 is determined to be the second threshold value or higher, the controller 21 stops the operation of the cogeneration system 200 (S26). If T2 is determined to be not the second threshold value or higher, the process returns to step S21. It should be noted that the above-described control relates to only the control to the circulating pump 13 based on T1 and T2, but other controls (the operations of the fuel cell and so forth) are of course carried out as appropriate by interruption processing, parallel processing, and the like. In addition, when the operation of the cogeneration system 100 is stopped, the control to the circulating pump 13 based on T1 and T2 is also stopped.

With such control, as T2 rises, the circulation flow rate of the circulating pump 13 increases, thereby reducing T2; therefore, overheating by the heater 18 can be prevented. Consequently, the second heat transfer medium is prevented from being overheated by the heater. Further, the hot water supplied to the hot water storage tank 20 can be prevented from boiling. Moreover, since the operation of the cogeneration system 200 is stopped if T2 becomes the second threshold value or higher, thermorunaway of the cogeneration system can be prevented. Furthermore, it is made possible to ensure safety such that the user will be prevented from a burn from hot water in the hot water storage tank that is abnormally brought to a high temperature due to boiling or the like. It should be noted that the cogeneration system of the second embodiment of course achieves the same advantageous effects as attained by the first embodiment likewise.

MODIFIED EXAMPLE

Although two threshold values for T2 have been used in the above description, it is also possible to use more threshold values to perform the control in a stepwise manner. The number of threshold values may be varied as necessary; two threshold values or four threshold values or more may be used. Alternatively, instead of the control using threshold values, the control target value for the flow rate may be determined based on water temperature using arithmetic expressions, tables, and the like.

For example, if T2 rises to the first threshold value or higher, the controller 21 raises the output of the circulating pump 13 to increase the flow rate of the water in the exhaust heat recovery circuit 12 by a first predetermined amount. If T2 rises to the second threshold value or higher (the second threshold value>the first threshold value), the controller 21 increases the flow rate of the water in the exhaust heat recovery circuit 12 further by a second predetermined amount, by raising the output of the circulating pump 13. Further, if T2 becomes the third threshold value or higher (the third threshold value>the second threshold value), the operation of the cogeneration system 200 is stopped.

Figure 6:
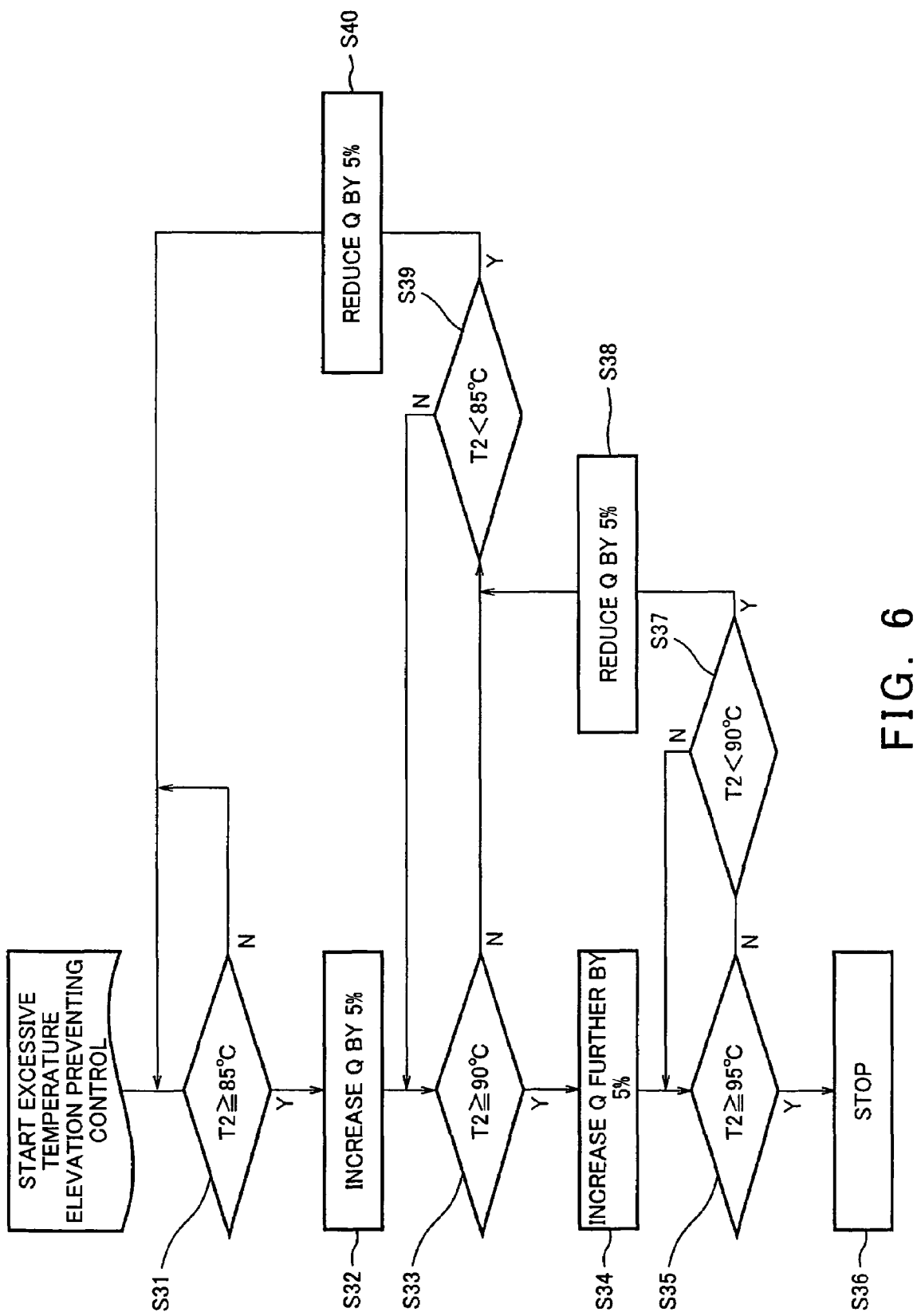
FIG. 6 is a flowchart schematically illustrating one example of the control based on T2, which is a part of the program for controlling water temperature by a controller in a modified example of the second embodiment of the present invention.

FIG. 6 is a flowchart schematically illustrating one example of the control based on T2, which is a part of the water temperature control program executed by a controller, in accordance with a modified example of the second embodiment of the present invention. The control based on T1 is the same as that shown in FIG. 5, and therefore the drawing and description thereof will be omitted. FIG. 6 illustrates an example in which the first threshold value is 85° C., the second threshold value is 90° C., the third threshold value is 95° C., the first predetermined amount is 5%, and the second predetermined amount is 5%. In addition, Q denotes the flow rate of the water discharged by the circulating pump 13. Hereinbelow, a water temperature control of the controller 21 according to the present modified example will be described with reference to FIG. 6. It should be noted that a cogeneration system 300 of the present modified example has the same system configuration as that of the cogeneration system 200 according to the second embodiment, and therefore further description thereof will be omitted.

After starting the excessive temperature elevation preventing control, if T2≧85° C. (S31), the controller 21 increases Q by 5% (S32). Further, if T2≧90° C. (S33), the controller 21 increases further Q by 5% (S34). If the heater 18 runs out of control and the temperature rises to T2≧95° C. (S35) even though the flow rate of the water discharged by the circulating pump 13 has been controlled, the controller 21 stops the system operation for safety reasons (S36). On the other hand, if the temperature T2<90° C. (S37), the controller 21 decreases Q by 5% (S38), and if T2<85° C. (S39), the controller 21 decreases Q further by 5% (S40). By the excessive temperature elevation preventing control in this manner, the controller 21 prevents the water heated by the heater 18 from boiling in advance and stops the system safely even if the heater 18 runs out of control in the worst case. It should be noted that the above-described control relates to only the control to the circulating pump 13 based on T2, but other controls (the operations of the fuel cell and so forth) are of course carried out as appropriate by interruption processing, parallel processing, and the like. In addition, when the operation of the cogeneration system 100 is stopped, the control to the circulating pump 13 based on T2 is also stopped.

In step S33, the phrase "increase Q by 5%" means that the controller 21 controls the circulating pump 18 so that Q will become 105% of $Q_0$. Likewise, in step S5, the phrase "increase Q further by 5%" means that the controller 21 controls the circulating pump 18 so that Q will become 110% of $Q_0$. In step S9, the phrase "decrease Q by 5%" means that the controller 21 controls the circulating pump 18 so that Q will become 105% of $Q_0$. Likewise, in step S11, the phrase "decrease Q further by 5%" means that the controller 21 controls the circulating pump 18 so that Q will become 100% of $Q_0$.

$Q_0$ denotes the flow rate determined by the control based on T1 as shown in FIG. 5.

In the present modified example, the flow rate is controlled in a stepwise manner by combining the temperature detected by the first temperature sensor and the temperature detected by the second temperature sensor. In the case of higher temperatures, the temperature can be lowered quickly by further increasing the flow rate. Such control makes it possible to keep the water temperature of the hot water supplied to the hot water storage tank 20 within an appropriate range (for example, from 70° C. to 95° C.) efficiently. Thus, the second heat transfer medium can be prevented from being overheated by the heater efficiently.

Third Embodiment

A characteristic feature of the cogeneration system according to a third embodiment is that the water in the hot water storage tank 20 is heated to a temperature (for example, 90° C.) that is believed to be capable of inhibiting propagation of germs, which is higher than the heat recovery target temperature (for example, 70° C.), by supplying electricity to the heater 18 for a certain period of time independently from the electricity supply by the generation of excessive electric power to the heater 18. The hardware and the control system are similar to those of the first embodiment (FIG. 1), and therefore, the description thereof will be omitted.

In the case of using a low-temperature type fuel cell (for example, a polymer electrolyte fuel cell) with an operating temperature of 60° C. to 70° C. for the electric power generator 5, the temperature of the water in the hot water storage tank 20 rises only to about 70° C. if no excessive electric power is supplied to the heater 18. If the hot water is not used for a long time, the water within the exhaust heat recovery system, including the exhaust heat recovery circuit 12 and the hot water storage tank 20, will be held in the exhaust heat recovery system for a long period of time without being replaced. In such a case, there is a possibility that germs (such as legionella) that are not killed at a temperature of about 70° C. may propagate.

In a cogeneration system 400 according to the present embodiment, electricity is supplied periodically to the heater 18 by the electric power generator 5 or by the power supply system 32 every predetermined time, for the purpose of killing the germs propagating in the exhaust heat recovery system by the control of the controller 21. In supplying electricity, the controller 21 causes the water in the exhaust heat recovery circuit 12 and the hot water storage tank 20 to circulate so that the temperature of the water in the exhaust heat recovery circuit and the hot water storage tank rises to about 90° C., which is higher than the target temperature for the normal heat recovery operation. The predetermined period may be a constant interval set by a timer (not shown) or the like, or the controller 21 may measure the time by making use of the timing device 82. It is also possible that the controller 21 may set a time in which the hot water use becomes infrequent by sensing the frequency of use of the hot water in the hot water storage tank 20 so that water heating can be carried out at the set time. It should be noted that when supplying electricity from the power supply system 32 to the heater 18, it is preferable that, referring to FIG. 2, the power supply system 32 and the heater 18 be connected so that electric power can be supplied via the controller 21.

In the cogeneration system of the present embodiment, the controller 21 allows the water inside the hot water storage tank 20 to be heated to a temperature (for example, 90° C.) higher than a target temperature (for example, 70° C.) for hot water supply to the hot water storage tank 20 every predetermined time by the heater 18. Such a configuration makes it possible to prevent propagation of germs in the hot water storage tank because the water in the hot water storage tank can be heated to a high temperature even when there is no excessive electric power.

From the foregoing description, numerous improvements and other embodiments of the present invention will be readily apparent to those skilled in the art. Accordingly, the foregoing description is to be construed only as illustrative examples and as being presented for the purpose of suggesting the best mode for carrying out the invention to those skilled in the art. Various changes and modifications can be made in specific structures and/or functions substantially without departing from the scope and sprit of the invention.

INDUSTRIAL APPLICABILITY

The cogeneration system according to the present invention is a cogeneration system that is capable of keeping the second heat transfer medium in the heat storage unit at a high target temperature when recovering the exhaust heat from the electric power generator and the heat produced by excessive electric power of the electric power generator to the second heat transfer medium and storing them into the heat storage unit, and is useful, for example, as fixed power generation equipment for home use.

The invention claimed is:

1. A cogeneration system comprising:
   an electric power generator;
   a cooling circuit configured to cool said electric power generator with a first heat transfer medium;
   a heat exchanger provided on said cooling circuit;
   an exhaust heat recovery circuit through which a second heat transfer medium that exchanges heat with the first heat transfer medium via said heat exchanger flows;
   a heat storage unit connected to said exhaust heat recovery circuit and configured to store the second heat transfer medium that has undergone the heat exchange by said heat exchanger; and
   a controller, wherein:
   a first temperature sensor and a heater to which electric power is supplied from said electric power generator are connected, in this order, downstream of said heat exchanger in a direction in which the second heat transfer medium flows;
   a circulating pump configured to circulate the second heat transfer medium is further connected to said exhaust heat recovery circuit; and
   said controller controls a flow rate of said circulating pump so that, based on a temperature detected by said first temperature sensor, the detected temperature approaches a predetermined target temperature.

2. The cogeneration system according to claim 1, wherein said controller stops an operation if the temperature detected by said first temperature sensor is a first determination temperature or higher.

3. The cogeneration system according to claim 1, further comprising a second temperature sensor provided downstream of said heater in the direction in which said second heat transfer medium flows, and wherein said controller increases flow rate of said circulating pump if the temperature detected by said second temperature sensor is a first threshold value or higher.

4. The cogeneration system according to claim 3, wherein said controller stops an operation if the temperature detected by said second temperature sensor is a second threshold value or higher, the second threshold value being higher than the first threshold value.

5. The cogeneration system according to claim 3, wherein said controller increases the flow rate of said circulating pump further if the temperature detected by said second temperature sensor is a second threshold value or higher, the second threshold value being higher than the first threshold value.

6. The cogeneration system according to claim 5, wherein said controller stops an operation if the temperature detected by said second temperature sensor is a third threshold value or higher, the third threshold value being higher than the second threshold value.

7. The cogeneration system according to claim 1, wherein said heater is supplied with excessive electric power of the electric power generated by said electric power generator that is not supplied to an external load.

8. The cogeneration system according to claim 1, wherein said electric power generator is a fuel cell.

9. The cogeneration system according to claim 1, wherein:
   said electric power generator is a solid polymer electrolyte fuel cell;
   said heat storage unit is a hot water storage tank; and
   water in said hot water storage tank is heated to a temperature higher than the predetermined target temperature by electricity supplied from a power supply system to said heater according to control by said controller.

* * * * *